(No Model.)
G. PHILION.
UPRIGHT SAW MACHINE.
No. 383,246. Patented May 22, 1888.
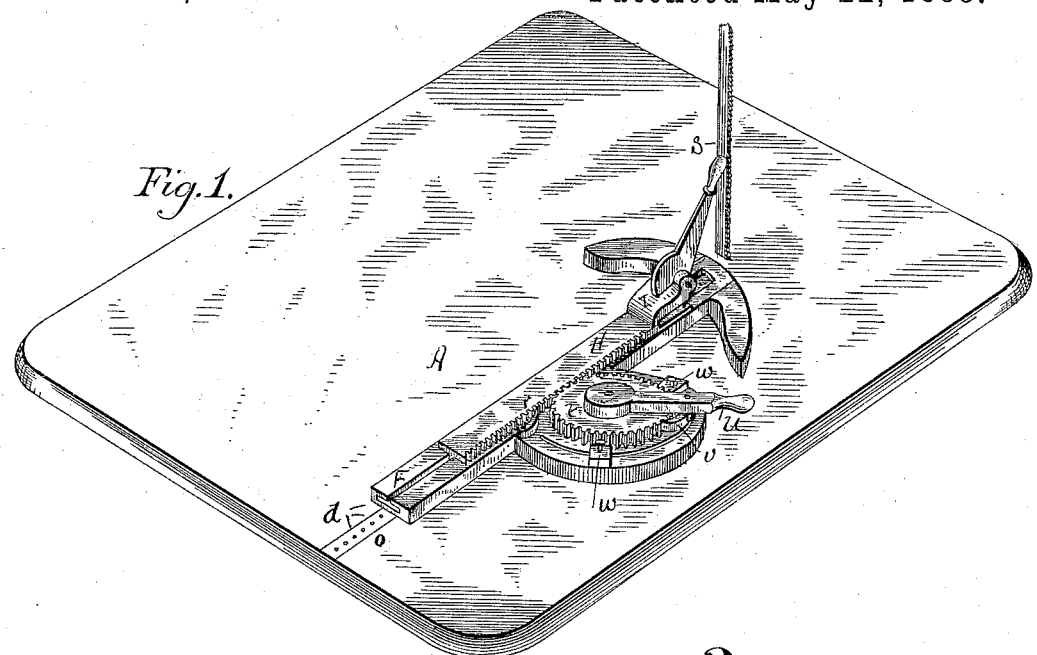
Fig. 1.
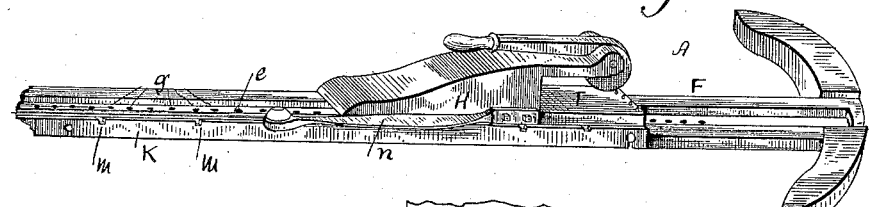
Fig. 2.
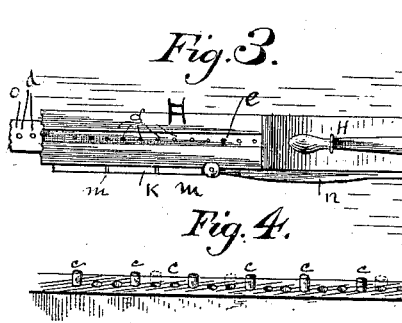
Fig. 3.
Fig. 4.
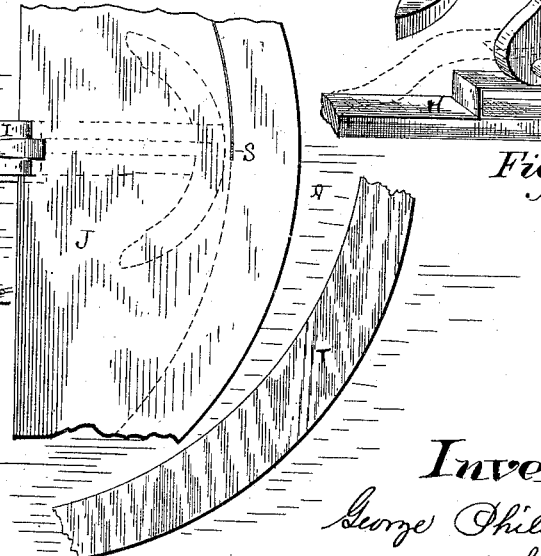
Fig. 6.
Fig. 5.
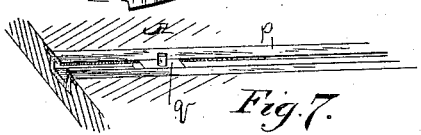
Fig. 7.
Witnesses:
J. B. McGinn.
Dor E. Gilt.
Inventor:
George Philion.
By his atty,
R. A. O. Smith.

UNITED STATES PATENT OFFICE.

GEORGE PHILION, OF MISHAWAKA, INDIANA, ASSIGNOR TO THE DODGE MANUFACTURING COMPANY, OF SAME PLACE.

UPRIGHT-SAW MACHINE.

SPECIFICATION forming part of Letters Patent No. 383,246, dated May 22, 1888.

Application filed September 20, 1887. Serial No. 250,201. (No model.)

*To all whom it may concern:*

Be it known that I, GEORGE PHILION, of Mishawaka, in the county of St. Joseph and State of Indiana, have invented new and useful Improvements in Upright-Saw Machines; and I do hereby declare that the following is a full and accurate description of the same, having reference to the accompanying drawings, wherein—

Figure 1 is a perspective view of my invention. Fig. 2 is a perspective view of a modified form of the same. Fig. 3 is a plan of the same. Figs. 4 and 5 represent modifications. Figs. 6 and 7 represent modifications.

The object of this invention is to saw circular segments from boards of proper length without previous marking with templets, and by way of illustration I will say that in the manufacture of wooden pulleys the rims are built up of curved segments cut from boards of one inch in thickness, the curvature of the convex edge of each segment having a radius slightly greater than the radius of the finished pulley, and the width of such segment is a little in excess of the thickness of the rim of the pulley when finished. Such a segment is shown in Fig. 3. Heretofore I have used templets to mark on the surface of the board the segments into which it should be cut, and afterward said segments are cut out with a band-saw.

A skillful sawyer will cut out about three times as fast as one man can mark with templets, and therefore four hands are required for each saw. It is useful in the after processes to have segments with the convex edges truly curved; but when produced with templets the segments are never cut on true curves, and always outside the line. Therefore there is an advantage in my improvement besides the saving of one-half the labor. Furthermore, an unskilled man can by my improvement work the machine more accurately than a skilled sawyer in the former way.

My invention consists in a frame pivoted on the saw-table at a point opposite the toothed edge of the saw and at right angles to its plane, a carriage movable on said frame in the direction of the saw, provided with a clamp to hold the board to be cut, so that when a proper piece of board has been clamped to said carriage the movement of the frame on its pivot will cause the board to be fed to the saw in a curved line.

In the accompanying drawings, A is an ordinary band-saw table. For convenience in cutting segments with such radius as may be desired, I place in the table a plate, o, having holes *d* every half inch to receive a pivot-pin, *e*. These holes represent radial centers, either one of which may be employed. Instead of the plate *c*, a slotted plate, *p*, may be substituted with center plate, *q*, movable therein, so that it may be fixed or set at any desired distance from the saw, as shown in Fig. 7.

A frame, F, is provided having a series of holes, *g*, corresponding to the series *d*, and the pivot-pin *e* may be passed through either one of said holes into the corresponding hole *d*, and the radius of the movement of frame F will be determined accordingly. A carriage, H, is mounted on said frame to slide longitudinally thereon, and on said carriage I place a clamp, I, to seize and hold the edge of the board or blank J while it is being presented to the saw S, and as such presentation is in a circular arc whose center is in the pin *e*, it follows that the saw-cut is in the same circular curve. When one cut has been completed, the carriage is advanced on the frame F a distance a little in excess of the thickness of the rim of the finished pulley, and then another cut is made, and so on successively until the board is all cut into segments T.

To adapt the mechanism to cut segments of different widths as well as with different curvatures, various means for spacing the forward movements of the carriage may be employed. In the drawings two ways are shown. In Fig. 1 the carriage is shown provided with a rack, *s*, and a pinion, *t*, the latter of which is moved by a lever, *u*, and pawl *v*, the movement of the lever being determined by stops *w*, one of which is adjustable to extend or reduce the distance, and thereby cut sections wider or narrower, as may be required. In Fig. 1 the spacing is effected by means of a notched bar, K, placed on the side of the frame F, and a latch-spring, *n*, on the carriage. The bar K is easily removable, so that another having its spacing-notches *m* differently placed may be substituted. Many other ways might be suggested, as a series of holes with pins *c*, as shown in Fig. 4, or a slot with movable stop-pins $h$, as shown in Fig. 5.

Having described my invention, I claim—

1. In an upright-saw machine, the combination of the table and saw thereof with a frame having a pivotal connection with said table, and a longitudinally-movable carriage on said frame, provided with a clamp to hold the edge of the board to be cut, and a feed-spacer with adjustable stops, whereby the length of the feeding-spaces may be changed.

2. In an upright-saw machine, the table A, the frame F, having a longitudinally-moving carriage, and a clamp mounted on the latter, combined with a pivot-pin and slots in table and frame, respectively, whereby said pivot-pin may be adjusted in said slots and fixed at any desired point.

3. In an upright-saw machine, the combination, with the pivoted frame, of the carriage mounted thereon and having a rack, a segment or gear mounted on the frame and engaging said rack, a lever and ratchet engaging the gear, and an adjustable stop for regulating the swing of the lever.

GEORGE PHILION.

Witnesses:
W. H. DODGE,
R. D. O. SMITH.